March 24, 1959     A. M. GRASS     2,879,062
FILM FEED FOR CAMERA
Original Filed April 1, 1952
Fig. 1
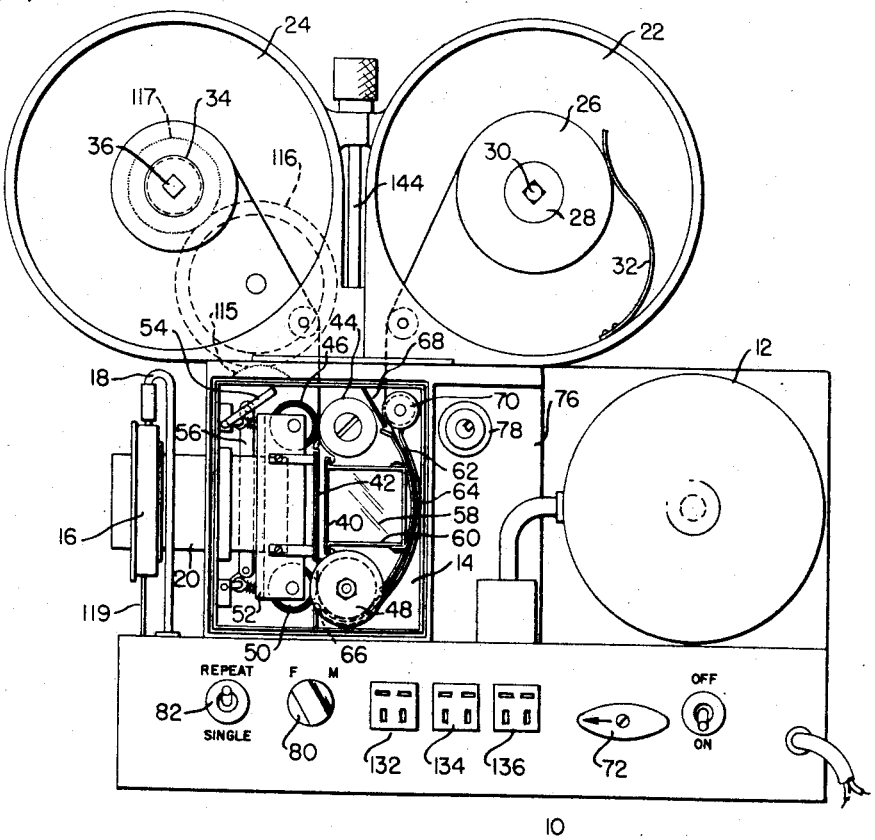
Fig. 2
*INVENTOR.*
ALBERT M. GRASS
BY
ATTORNEYS

2,879,062
FILM FEED FOR CAMERA

Albert M. Grass, Quincy, Mass.

Original application April 1, 1952, Serial No. 279,761, now Patent No. 2,754,721, dated July 17, 1956. Divided and this application April 2, 1956, Serial No. 575,497

2 Claims. (Cl. 271—2.3)

The present invention relates to cameras, and more particularly to cameras for making photographs under a wide variety of selected conditions, as in the photography of scientific phenomena, the recording of cathode ray traces, the photography of phenomena at precisely timed intervals, and the like. This application is a division of my copending application Serial No. 279,761, filed April 1, 1952, now Patent No. 2,754,721.

The principal object of the present invention is to provide drive means for a camera of the general type described in said application, which drive means acts to advance the film or paper positively, but without the use of sprockets.

With the foregoing and other objects in view, as will hereinafter appear, the present invention comprises the camera equipment hereinafter described and particularly defined in the claims.

In the accompanying drawings, Fig. 1 is a side elevation of the preferred form of camera, and Fig. 2 is a detail of the feed roller.

The apparatus shown in Fig. 1 comprises a base 10 within which is received the control equipment to be later described, and on which is mounted a drive motor 12. At the front of the base is mounted the camera proper which comprises the exposure compartment 14 and the lens and shutter assembly 16. The shutter is preferably of the self cocking type and is provided with internal contacts (not shown) similar to those used for flash synchronization and adapted to be closed when the shut-blades are wide open and to open immediately before the blades start to close. A cable 18 leads from the shutter contacts to the control circuits in a manner to be later described. The shutter and lens assembly is mounted on a tube 20 which may be slid back and forth slightly with respect to the exposure chamber for purposes of focusing.

Two magazines 22 and 24 are provided. The supply of sensitized material such as film or paper shown at 26 is contained within the supply magazine 22. The supply is mounted on a core 28 which is supported on a central shaft 30 with only sufficient friction to permit orderly unrolling of the film without coiling. Alternatively, a spring brake 32 may bear directly against the sensitized material itself, whereby the braking action decreases as the size of the roll decreases thereby more correctly relating the braking action to the inertia of the roll.

The magazine 24 is a take-up magazine having a core 34 to which the film is connected in any suitable manner. The core 34 is mounted on a shaft 36 which is driven through a friction clutch at a speed suitable for take-up in a manner described in my copending application.

The length of film between the magazines runs through the magazine 22 in a manner described in said application, and loops through the exposure chamber and thence to the take-up magazine 24.

Within the exposure chamber there is a fixed gate 40 and a movable gate 42 between which the film is guided during exposure. Above the gates is a drive roller 44 which engages the back of the sensitized material, that is, the shiny side of the film or the base of the paper and presses it against a rubber covered roll 46. In order to permit use of unperforated film or paper, the roller 44 firmly engages the sensitized material and is therefore preferably formed with sharp longitudinal teeth in the manner of a spur gear as shown in Fig. 2, the teeth being indicated at 47. These engage the sensitized material with sufficient firmness to insure precise transport, but they do not mar the surface.

Control roller 48 similar to the roller 44 is provided below the gates and is adapted to engage the film between it and a rubber covered roller 50, which is similar to the roller 46. While the roller 44 is used to drive the film, the roller 48 is driven by the film and is itself used to control various operations to be presently described.

The movable gate 42 and the rollers 46 and 50 are mounted on a laterally movable carriage 52 which is operated by a lever 54 through suitable linkage 56 to move the gate and rubber rollers to the left and thereby permit insertion of the film.

A 45-degree mirror 58 is mounted in back of the film gate 40 and is arranged to permit the rear of the film to be observed from the side of the apparatus for focusing and for other purposes as will be later described. The mirror is contained in a frame 60 and in back of the frame is a curved guide plate 62 over which the film passes. A second guide plate 64 is spaced from the guide 62 and it runs under the roller 48 to terminate in an upwardly directed portion 66. The space between the guides 62 and 64 forms a trough to permit threading of the film into the camera. Entering the film into the trough is facilitated by an inclined guide plate 68 and a spool 70 at the upper part of the exposure chamber.

To thread the film the end of the film protruding from the supply magazine 22 is threaded into the trough between the guides 62 and 64 and is pushed until its end appears above the portion 66 of the outer guard. At this time the carriage 52 will be at the left, thereby affording substantial space betwen the toothed rollers 44 and 48 and their respective rubber rollers 46 and 50. A vertical plate may then be inserted against the part 66 of the guide plate, and upon further advance of the film the end of the film will slide along the vertical plate to enter the take-up magazine 24. The end of the film is then attached to the core 34 and the threading is completed, the vertical guide plate being then removed. The carriage 52 is then restored to its position whereby the film is closely maintained between the two gates 40 and 42. A cover is provided for the exposure chamber and the cover has a dark slide by which the rear of the film may be viewed in the mirror 58; focusing is done by adjusting the lens and shutter assembly until a clearly focused view is observed in the mirror. After the camera is threaded, the focusing operation admits light only to a single frame and hence only the frame which is in position when the focusing operation is being carried on is wasted.

The motor may be driven at a number of speeds controlled by a switch 72 on the base; preferably three speeds are provided. The motor is connected through gears with a change speed mechanism 76, which may be of any suitable form. For the purposes of this description, it is sufficient to state that the operation of the gear box is controlled by a sliding sleeve 78. The gear box, whatever its construction, is preferably designed for a decade operation whereby the speed may be controlled in jumps of 10. It has been found for most convenient operation, the maximum film speed obtainable from the motor at full speed is one meter per second. The gear box preferably reduces the speed in the ratios 1/10, 1/100 and 1/1000 whereby speeds of 1/10 meter, 1 cm. and 1 mm. per second may be obtained. The switch 72 preferably controls operation of the motor at half and quarter speeds, so that a still finer selection is obtainable. It will be seen, therefore, that the film speed is variable in relatively small steps from .25 mm. to 1 meter per second.

On the panel there is mounted a switch 80 by which the operator may selectively determine continuous motion or framed motion of the film. A manual switch 82 may be used to give repeat or single frame operation. The operations of the camera are fully described in my above-mentioned patent.

Having thus described the invention, I claim:

1. In a camera, transport means for an unperforated strip of material having a photographic emulsion on one side, comprising a drive roller having sharp teeth extending along the greater portion of the length of the roller to engage the non-emulsion side of the material without penetrating the material, a support roller having a smooth unobstructed cylindrical elastic surface to engage the emulsion side of the material, said support roller and said drive roller being rotatably mounted parallel to one another to have said teeth press the material into said elastic surface of said support roller whereby the strip of material is pressed into depressions formed by said teeth pressing toward said elastic surface.

2. In a camera, a strip of material and transport means therefor comprising an unperforated strip of material having a photographic emulsion on one side, a drive roller having sharp teeth extending along the greater portion of the length of the roller to engage the non-emulsion side of said material without penetrating the material, a support roller having a smooth unobstructed cylindrical elastic surface to engage the emulsion side of said material, said support roller and said drive roller being rotatably mounted parallel to one another, said teeth pressing said strip of material into said elastic surface of said support roller whereby said strip of material is pressed into depressions formed by said teeth pressing toward said elastic surface.

References Cited in the file of this patent

UNITED STATES PATENTS 1,303,837    Wyckoff et al. _____ May 13, 1919